US006244043B1

(12) United States Patent
Farmer et al.

(10) Patent No.: US 6,244,043 B1
(45) Date of Patent: Jun. 12, 2001

(54) EMISSION CONTROL DEVICE AIR/FUEL RATIO CONTROL SYSTEM

(75) Inventors: David George Farmer, Plymouth; Gopichandra Surnilla, Westland; Jerry Dean Robichaux, Riverview; Salomone Castro, Oak Park, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/315,222

(22) Filed: May 19, 1999

(51) Int. Cl.[7] ....................................... F01N 3/00
(52) U.S. Cl. ................................ 60/274; 60/285; 60/286
(58) Field of Search ........................ 60/274, 285, 286, 60/301

(56) References Cited

U.S. PATENT DOCUMENTS

| | | | | |
|---|---|---|---|---|
| 3,827,237 | * | 8/1974 | Linder et al. | 60/285 |
| 5,207,058 | * | 5/1993 | Sasaki et al. | 60/284 |
| 5,517,820 | * | 5/1996 | Kuroda et al. | 60/274 |
| 5,657,625 | | 8/1997 | Koga et al. . | |
| 5,661,971 | | 9/1997 | Waschatz et al. . | |
| 5,758,493 | | 6/1998 | Asik et al. . | |
| 5,884,476 | * | 3/1999 | Hirota et al. | 60/278 |
| 5,970,707 | * | 10/1999 | Sawada et al. | 60/277 |
| 5,974,788 | * | 11/1999 | Hepburn et al. | 60/274 |
| 5,974,793 | * | 11/1999 | Kinugasa et al. | 60/285 |
| 5,987,884 | * | 11/1999 | Kibe et al. | 60/285 |
| 6,014,859 | * | 1/2000 | Yoshizaki et al. | 60/285 |
| 6,047,542 | * | 4/2000 | Kinugasa et al. | 60/285 |

FOREIGN PATENT DOCUMENTS

| | | | | |
|---|---|---|---|---|
| 1334797 | * | 10/1973 | (GB) | 60/301 |
| 2316338 | | 2/1998 | (GB) . | |
| 04365920 | * | 12/1992 | (JP) | 60/286 |

* cited by examiner

*Primary Examiner*—Thomas Denion
*Assistant Examiner*—D. Tran
(74) *Attorney, Agent, or Firm*—John Russell

(57) ABSTRACT

A nitrous oxide trap temperature control system for desulfating the trap uses and engine with some cylinders operating with lean combustion and some cylinders operating with rich combustion. The lean and rich combustion gases are combined to form an mixture which is fed to the trap to provide an exothermic reaction. The desired lean and rich air/fuel ratios of the respective lean and rich cylinders are determined based in part on the difference between the trap temperature and a desired trap temperature. The desired lean and rich air/fuel ratios of the respective lean and rich cylinders are also determined from the desired mixture air/fuel ratio entering the trap.

17 Claims, 4 Drawing Sheets

EMISSION CONTROL DEVICE AIR/FUEL RATIO CONTROL SYSTEM

FIELD OF THE INVENTION

The invention relates to a system and method for controlling the air/fuel ratio of a mixture of exhaust gasses entering an emission control device during sulfur purging.

BACKGROUND OF THE INVENTION

Engine systems are known which operate the engine with lean combustion, or a lean air/fuel ratio, to improve fuel economy. To accommodate lean burn conditions, emission control devices, such as nitrous oxide (NOx) traps, are used to adsorb nitrous oxide emissions produced during lean operation. Adsorbed nitrous oxide is periodically purged by operating the engine with rich combustion, or a rich air/fuel ratio.

During normal lean and rich operation, sulfur contained in the fuel can become trapped in the emission control device. This gradually degrades the emission device capacity for storing nitrous oxide, as well as the device efficiency. To counteract the sulfur effect, various sulfur decontamination methods are available.

One method for sulfur decontamination requires elevating the emission control device temperature to a predetermined value. Then, additional fuel is injected while the catalyst is at this elevated temperature to reduce the sulfur stored in the device. The temperature of the device is raised by operating some of the cylinders lean and some of the cylinders rich. When the lean and rich exhaust gases meet in the device, exothermic reactions takes place, thereby releasing heat to increase the device temperature. The lean and rich exhaust gases are kept at certain desired lean and rich air/fuel ratios to maintain the average air/fuel ratio of the mixed exhaust gases at a desired air/fuel ratio. The desired lean and rich air/fuel ratios are determined in table look-up fashion with various correction factors. An exhaust gas air/fuel ratio sensor is relied upon to correct the desired lean and rich air/fuel ratios for control errors in the correction factors. Such a method is described in U.S. Pat. No. 5,657,625.

The inventors herein have recognized a disadvantage with the above approach. In particular, the method described for maintaining the average mixed exhaust air/fuel ratio is cumbersome and overly complex. In addition the above method requires an additional exhaust air/fuel ratio sensor because the open loop methods are not robust. Extensive testing and development, along with excessive computer memory storage and cost are necessary to use the above method. In other words, a simple, straightforward, and accurate method is not shown for determining a desired lean air/fuel ratio for the lean cylinders and a desired rich air/fuel ratio for the rich cylinders such that a desired exhaust gas mixture air/fuel ratio is achieved.

SUMMARY OF THE INVENTION

An object of the invention claimed herein is to provide a system and method for controlling cylinder air/fuel ratios for desulfating an emission control device, whereby the emission control device is heated by operating some cylinders of an engine lean and some cylinders of an engine rich.

The above object is achieved, and disadvantages of prior approaches overcome, by a method for air/fuel ratio control of an exhaust gas mixture entering an emission control device, the emission control device located in an exhaust passage of an internal combustion engine having at least a first and second cylinder. The method comprising the steps of generating a desired lean air/fuel ratio for the first cylinder so that a desired emission control device temperature is achieved, operating the first cylinder at said desired lean air/fuel ratio, generating a desired rich air/fuel ratio for the second cylinder based on said desired lean air/fuel ratio and based on a desired air/fuel ratio of the exhaust gas mixture, wherein exhaust gases from the first and second cylinders form the exhaust gas mixture, and operating the second cylinder at said desired rich air/fuel ratio.

By calculating the desired lean air/fuel ratio for the lean cylinders to control trap temperature and then calculating a corresponding rich air/fuel ratio for the rich cylinders, the exhaust mixture from the lean and rich cylinder can be accurately controlled to form a desired mixture air/fuel ratio. In other words, the temperature control task is used for calculating the desired lean air/fuel ratio, since increasing or decreasing the lean air/fuel ratio has the effect of increasing or decreasing trap temperature. Then, since a certain air/fuel ratio is desired for the mixture of the lean and rich cylinders, this desired mixture air/fuel ratio, along with the just calculated lean air/fuel ratio is used to calculate the desired rich air/fuel ratio. In this way, the temperature is controlled to the desired level and the mixture from the lean and rich cylinders forms a desired mixture air/fuel ratio with no additional correction or sensor feedback.

In an alternative embodiment, the above object is achieved, and disadvantages of prior approaches overcome, by a method for air/fuel ratio control of an exhaust gas mixture entering an emission control device, the emission control device located in an exhaust passage of an internal combustion engine having at least a first and second cylinder, the method comprising the steps of generating a desired rich air/fuel ratio for the first cylinder so that a desired emission control device temperature is achieved, operating the first cylinder at said desired rich air/fuel ratio, generating a desired lean air/fuel ratio for the second cylinder based on said desired rich air/fuel ratio and based on a desired air/fuel ratio of the mixture of exhaust gasses, wherein exhaust gasses from the first and second cylinders form the exhaust gas mixture, and operating the second cylinder at said desired lean air/fuel ratio.

In this embodiment, the calculation order is reversed, and the rich air/fuel ratio is first calculated to control the trap temperature. Then, the lean air/fuel ratio is calculated based on the rich air/fuel ratio and the desired mixture air/fuel ratio. By calculating the desired rich air/fuel ratio for the rich cylinders to control temperature and then calculating a corresponding lean air/fuel ratio for the lean cylinders, the exhaust mixture from the lean and rich cylinder can be accurately controlled the desired mixture air/fuel ratio.

In an alternative embodiment, the above object is achieved, and disadvantages of prior approaches overcome, by a method for air/fuel ratio control of an exhaust gas mixture entering an emission control device, the emission control device located in an exhaust passage of an internal combustion engine having at least a first and second cylinder, the method comprising the steps of generating a desired air/fuel ratio difference between the first cylinder and the second cylinder so that a desired emission control device temperature is achieved, generating a desired lean air/fuel ratio for the first cylinder based on said desired air/fuel ratio difference and based on a desired air/fuel ratio of the exhaust gas mixture, wherein exhaust gasses from the first and second cylinders form the exhaust gas mixture, generating a desired rich air/fuel ratio for the second cylinder based on said desired air/fuel ratio difference and based on said desired air/fuel ratio of said exhaust gas mixture.

In this embodiment, the air/fuel ratio difference between the rich and lean cylinders is used to control trap temperature. Then, both the lean and rich cylinder air/fuel ratios are calculated from the air/fuel ratio difference and the desired exhaust mixture air/fuel ratio. Because the air/fuel ratio difference between the rich and lean cylinders is proportional to the heat addition to the trap, this parameter can be used to control trap temperature. Then, to provide the desired difference with a certain mixture air/fuel ratio, the desired rich and lean cylinder air/fuel ratio is accurately calculated.

An advantage of all embodiments of the present invention is improved nitrous oxide trap durability.

Another advantage of all embodiments of the present invention is improved nitrous oxide conversion efficiency.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
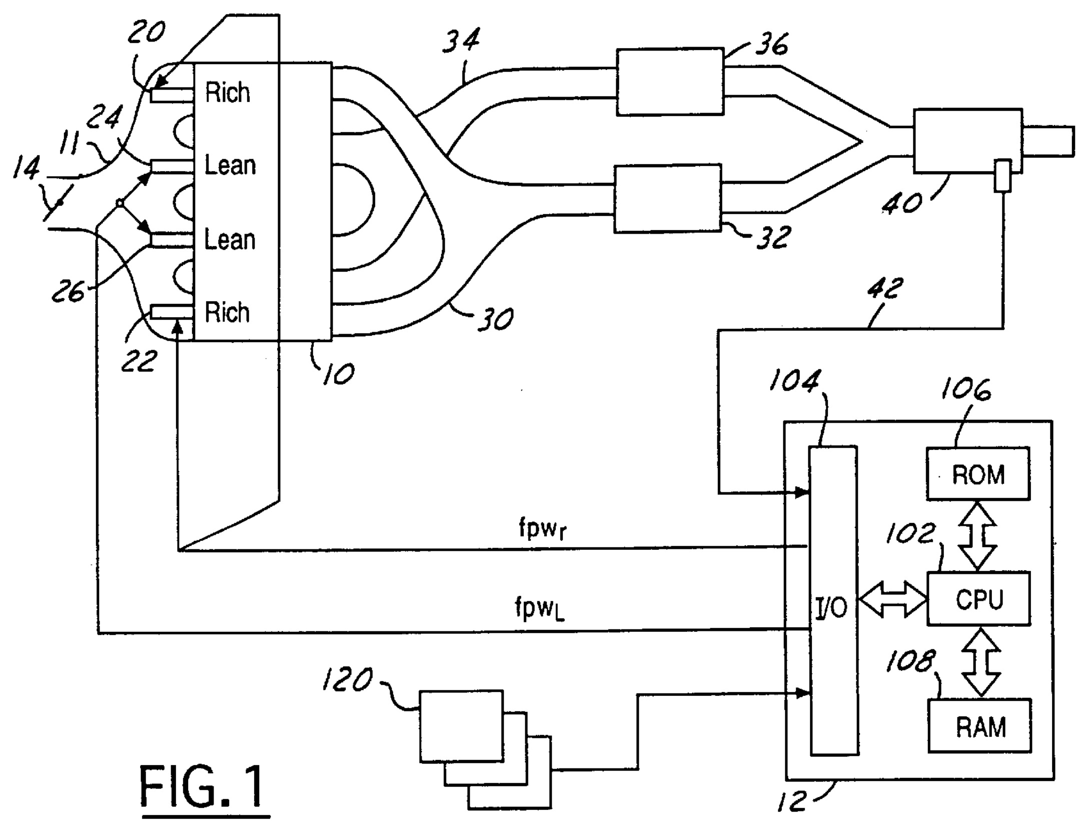
FIG. 1 is a block diagram of an embodiment herein the invention is used to advantage.

FIG. 1 shows internal combustion engine 10, comprising multiple cylinders coupled to intake manifold 11. The engine cylinders are capable of operating within a range of air/fuel ratio ranging from a lean limit to a rich limit. FIG. 1 shows two cylinders operating at a lean air/fuel ratio and two cylinders operating at a rich air/fuel ratio. The cylinders of engine 10 receive air from intake manifold 11 under control of throttle plate 14. The rich cylinders receive fuel from injectors 20 and 22. The lean cylinders receive fuel from injectors 24 and 26. The rich cylinders produce exhaust gas that has unburned hydrocarbons and carbon monoxide while the lean cylinders produce exhaust flow that has excess oxygen. The rich exhaust gas exits the rich cylinders through rich manifold 30 and pass through first three way catalyst 32. The lean exhaust gas exits the lean cylinders through lean manifold 34 and pass through second three way catalyst 36. Rich and lean gases then come together to form an exhaust mixture with a exhaust gas mixture air/fuel ratio before entering lean NOx trap 40. The catalytic activity of trap 40 promotes an exothermic chemical reaction from the exhaust mixture formed of both lean and rich gases, resulting in catalyzed combustion, the generation of heat, and the increase of temperature of trap 40.

While the preferred embodiment employs two cylinders operating rich and an equal number of cylinders operating lean, various alternative embodiments are possible. For example, any total number of cylinders may be used with the number of lean and rich cylinders also being variable. For example, an 8 cylinder engine may have 5 cylinders operating lean with 3 cylinders operating rich. In either equally or unequally divided systems, the desired lean and rich air/fuel ratios are determined as will be described later herein with particular reference to FIGS. 2–10.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors 120 coupled to engine 10. In addition, controller 12 receives an indication of trap 40 temperature (T) from temperature sensor 42. Alternatively, temperature (T) may be estimated using various methods known to those skilled in the art. Controller 12 also sends signal fpwr to fuel injectors 20 and 22 and sends signal fpwl to fuel injectors 24 and 26.

FIGS. 2–9 are high level flow charts of various operations performed for desulfating trap 40. These routines are executed when it has been determined that proper conditions exist for trap desulfation. Various methods are known for determining entry conditions, such as, for example, when vehicle speed is greater than a predetermined value and nitrous oxide trapping efficiency is less than a predetermined value. Other conditions including engine speed, engine load, and gear ratio may be used. In general, trap desulfation is performed when trap 40 is saturated with sulfur and degraded operation has been detected or is suspected. Also, a minimum trap temperature is required to guarantee the that hydrocarbons and carbon monoxide will be oxidized by the excess oxygen as described later herein.

Figure 2:
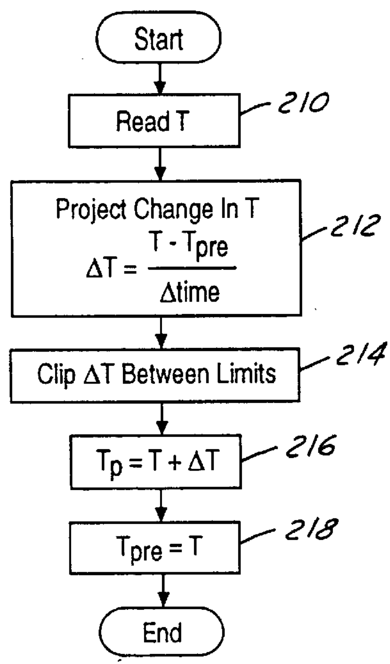
FIGS. 2–10 are high level flow charts of various operations performed by a portion of the embodiment shown in FIG. 1.

Referring now to FIG. 2, a routine for projecting temperature (T) of trap 40 is described. First, in step 210, the actual temperature is read from sensor 42. As previously described herein, the actual trap temperature may be estimated using various methods known to those skilled in the art. Then, in step 212, the projected change in trap temperature ($\Delta$T) is calculated based on the difference between the current temperature value (T) and the previous temperature value (Tpre) divided by the sample time ($\Delta$time). Then, in step 214, the projected change in trap temperature ($\Delta$T) is clipped between maximum and minimum values, where the maximum and minimum values are predetermined calabratable values. Then, in step 216, the clipped projected change in trap temperature ($\Delta$T) is added to the current temperature value (T) to form the predicted temperature value (Tp). In step 218, the previous temperature (Tpre) is set to the current temperature value (T).

Figure 3:
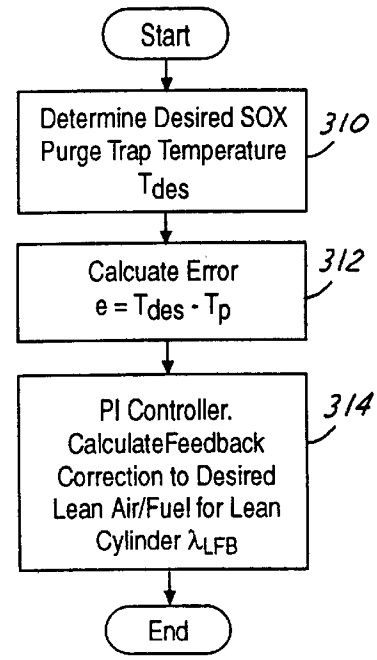

Referring now to FIG. 3, a routine for determining a feedback amount for controlling trap temperature (T) to a desired temperature (Tdes) is described. In step 310, the desired desulfation temperature (Tdes) for the trap 40 is determined. In a preferred embodiment, this is a predetermined constant value. However, the desired temperature may be adjusted based on various factors, such as, for example, trap efficiency, trap age, or any other factor known to those skilled in the art to affect optimum temperature for desulfation. Then, in step 312, the temperature error (e) is calculated from the difference between desired temperature (Tdes) and predicted temperature (Tp). In step 314, the temperature error (e) is processed by a proportional and integral feedback controller (known to those skilled in the art as a PI controller) to generate a correction ($\lambda$LFB) to the desired lean air/fuel ratio for the cylinders operating with lean combustion.

Figure 4:
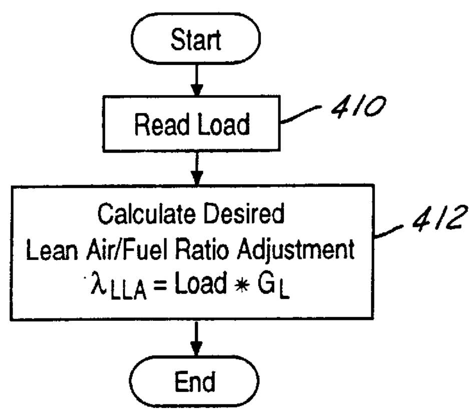

Referring now to FIG. 4, a routine is described for calculating a feed forward correction value for the desired lean air/fuel ratio that accounts for engine load changes. First in step 410, the engine load is read. In a preferred embodiment, engine load is represented by the ratio of engine airflow, determined from, for example, a mass air flow meter, to engine speed. Then, in step 412, the desired lean air/fuel ratio adjustment ($\lambda$LLA) due to engine load is calculated as the product of load and predetermined gain (G1). The load correction is necessary because engine load has a strong influence on heat added to trap 40. For example, if the lean and rich cylinder air/fuel ratios are kept constant, but a large increase in airflow occurs, then substantially more heat is added to trap 40.

Figure 5:
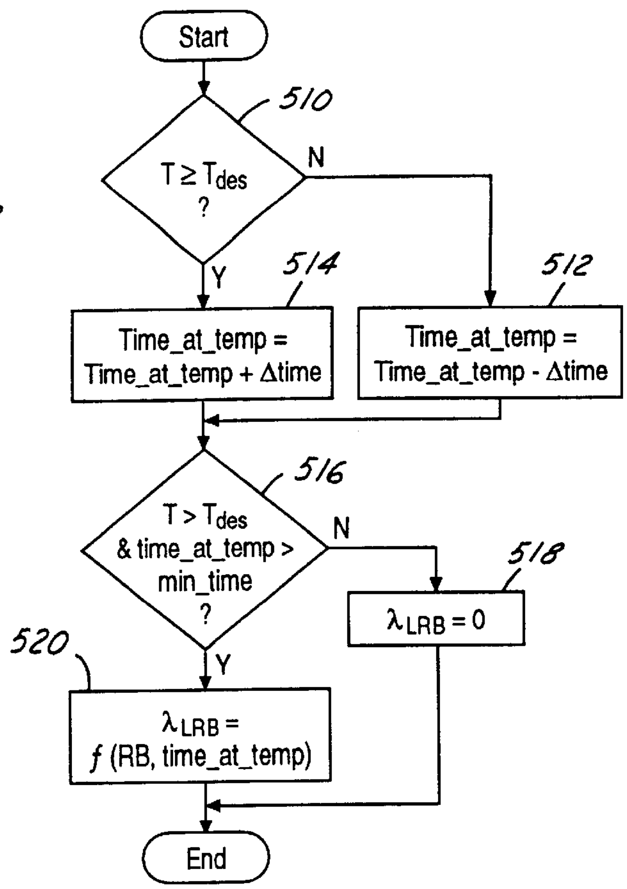

Referring now to FIG. 5, a routine for determining a desired rich bias to add to the desired lean air/fuel ratio is determined. The desired rich bias is used for giving a slight rich bias to the mixture air/fuel ratio. This slightly rich mixture releases the stored sulfur oxide in the trap when the trap is at the proper desulfation temperature as described herein. In addition, this rich bias also creates additional exothermic heat which tends to further increase the trap temperature. To account for this in a feed forward fashion, the rich bias is also used to adjust (decrease) the desired difference in lean and rich air/fuel ratios. Thus, the additional heat added from the rich bias is counteracted in a feed forward way by providing less exothermic heat from the lean and rich exhaust gases. In this way, trap temperature can be more accurately controlled to a desired temperature, even when adding the rich bias.

First, in step 510, a determination is made as to whether trap temperature (T) is greater than or equal to the desired temperature (Tdes). If the answer to step 510 is NO, then the parameter (time_at_temp), which tracks the time duration the trap is at or above the desired temperature, is adjusted as shown in step 512. Otherwise, the parameter time_at_temp is adjusted as shown in step 514. Then, in step 516, a determination is made as to whether trap temperature (T) is greater than or equal to the desired temperature (Tdes) and if parameter time_at_temp is greater than predetermined value min_time. The value min_time represents the minimum time for which the trap temperature (T) is above or equal to the desired temperature (Tdes) before desulfation is allowed. If the answer to step 516 is NO, then the rich bias adjustment ($\lambda$LRB) is set to zero in step 518. Otherwise, the rich bias adjustment value ($\lambda$LRB) is calculated based on the desired rich bias (RB) and the parameter time_at_temp in step 520. In general, the time_at temp value is used to allow the entire trap material to achieve the desired temperature (Tdes). For example, a rolling average filter may be used to calculated ($\lambda$LRB).

Figure 6:
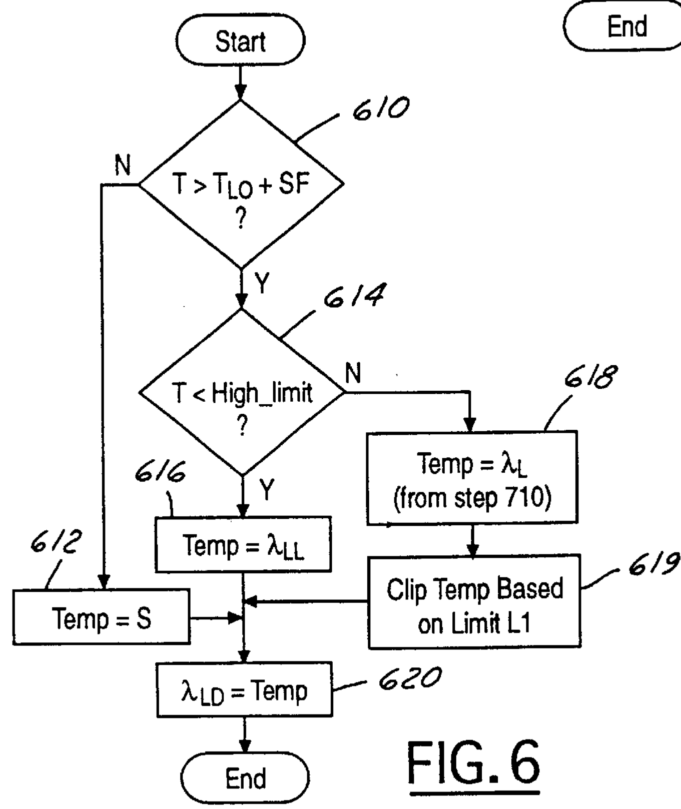

Referring now to FIG. 6, a routine for clipping the desired lean air/fuel ratio is described. First, in step 610, a determination is made as to whether the trap temperature (T) is greater than the sum of a lower control limit (TLO) and a safety factor (SF). If the answer to step 610 is NO, then in step 612, the temporary value (temp) is set to the stoichiometric air/fuel ratio (S). This prevents operation of some cylinders lean and some cylinders rich below the light off temperature of the trap. In other words, operating with lean and rich combustion for temperature control below a light off temperature will actually cause the temperature of trap 40 to reduce. This will give a reversal of controls and cause the controller to become unstable, resulting in degraded performance. Continuing with FIG. 6, if the answer to step 610 is YES, then in step 614, a determination is made as to whether trap temperature (T) is less than high temperature limit (high_limit), where high_limit is a temperature greater than the sum of lower control limit (TLO) and safety factor (SF). High_limit represents a limit below which closed loop control is not used to prevent poor controlability. If the answer to step 614 is YES, then in step 616, the temporary value (temp) is set to a predetermined constant value ($\lambda$LL). This predetermined constant value accomplishes the following advantage. If closed loop temperature control is attempted below a certain temperature, the trap can initially cool below the light off temperature. Thus, unless the control is performed according to the present invention, an infinite cycle is encountered where trap temperature is never controlled to the desired temperature. Constant value ($\lambda$LL) is determined based on experimental testing to provide a certain acceptable temperature increase rate of trap 40.

Continuing with FIG. 6, if the answer to step 614 is NO, then temporary value (temp) is set to a the desired lean air/fuel ratio ($\lambda$L) determined in step 710, described later herein with particular reference to FIG. 7. Then, in step 619, the temporary value is clipped to a maximum limit value L1. Maximum limit value L1 represents the lean air/fuel ratio at which maximum incremental heat is added to increase trap temperature described later herein with particular reference to FIG. 10. If the alternative embodiments are being employed, the maximum limit value can represent the rich air/fuel ratio, or the air/fuel ratio difference, at which maximum incremental heat is added to increase trap temperature. Additional limits may also be used to prevent the engine from experiencing engine misfire or other engine stability limits. For example, the maximum lean air/fuel ratio can be clipped based on engine mapping data so that engine misfire does not occur. In step 1020, the clipped desired lean air/fuel ratio is set to temporary value (temp).

As described herein, if the order of operations are reversed and the desired rich air/fuel ratio is first calculated, then the routine above can be used by simply substituting the desired rich air/fuel ratio for the desired lean air/fuel ratio and appropriate adjustment of the calibration parameters. Similarly, the air/fuel ratio span can be used by simple substitution.

Figure 7:
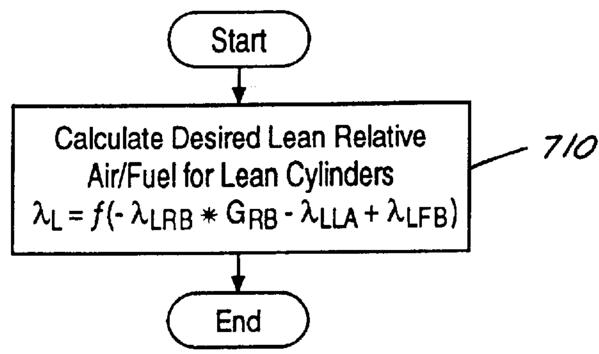

Referring now to FIG. 7, the desired lean air/fuel ratio ($\lambda$L) is calculated for controlling fuel injection to the lean cylinders, where the parameter $\lambda$ indicates a relative air/fuel ratio, as is known to those skilled in the art. In step 710, the desired lean air/fuel ratio ($\lambda$L) is calculated, where GRB is a predetermined gain. In a preferred embodiment, the desired lean air/fuel ratio ($\lambda$L) is calculated as shown below:

$$\lambda L=(\lambda LRB*GRB-\lambda LLA+\lambda LFB)$$

Figure 8:
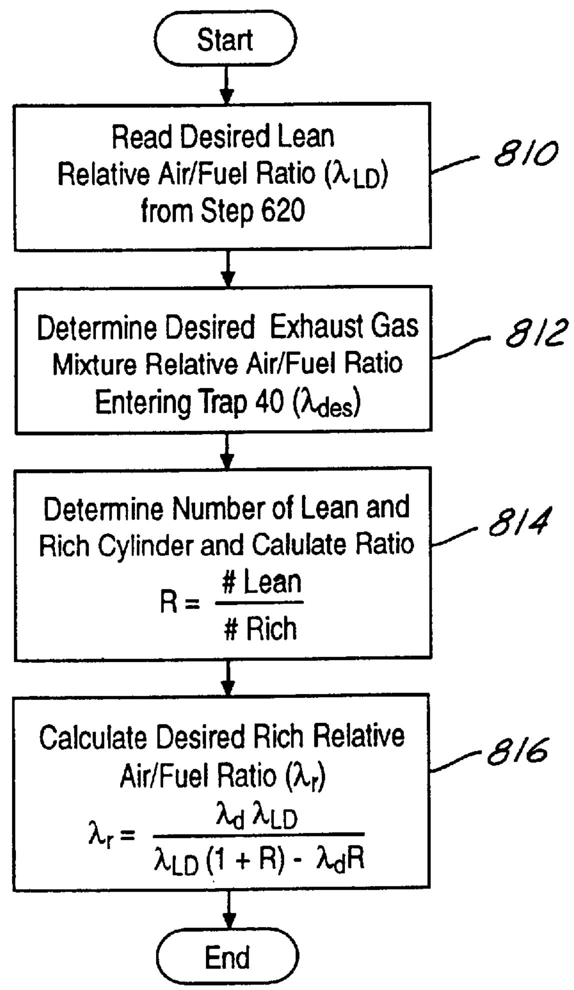

Referring now to FIG. 8, the desired rich air/fuel ratio ($\lambda$R) is calculated based on the desired lean air/fuel ratio. The desired rich air/fuel ratio is used for controlling fuel injection to the rich cylinders. First, in step 810, the clipped desired lean air/fuel ratio ($\lambda$Ld) is read from step 620 described previously herein with respect to FIG. 6. Then, in step 812, the desired exhaust gas mixture air/fuel ratio ($\lambda$des) is determined, where again the parameter ($\lambda$) refers to a relative air/fuel ratio. In step 814, the ratio (R) of the number of lean cylinders to the number of rich cylinders is calculated. Then, in step 816, the desired rich air/fuel ratio ($\lambda$R) is calculated according to the equation below:

$$\lambda R=\frac{\lambda des*\lambda Ld}{\lambda Ld(1+R)-\lambda des*R}$$

This equation can be simplified when the desired air/fuel ratio is stoichiometric and the ratio (R) is unity to the following equation:

$$\lambda R=\frac{\lambda Ld}{2*\lambda Ld-1}$$

In an alternative embodiment, the order of calculation can be reversed with respect the desired lean and rich air/fuel ratios. In other words, the desired rich air/fuel ratio can be calculated based on the feedback correction (λLFB), rich bias adjustment (λRB), and lean air/fuel ratio adjustment (λLLA) and clipped in a similar fashion to the desired lean air/fuel ratio. Then, the desired lean air/fuel ratio is calculated according to the following equation:

$$\lambda L = \frac{\lambda des * \lambda Rd * R}{\lambda Rd(1 + R) - \lambda des}$$

In another alternative embodiment, the air/fuel ratio span, the difference between the lean air/fuel ratio and the rich air/fuel ratio, can be used to control trap temperature (T). In this case, the desired air/fuel ratio span (Δλ) is determined based on temperature error and the feed forward load correction and feed forward rich bias correction. The desired air/fuel ratio span (Δλ) can then be clipped in a similar fashion to the clipping of the desired lean air/fuel ratio. Then, the desired lean and rich air/fuel ratios can be determined as shown by the equations below:

$$\lambda L = \frac{1}{2}\left(\Delta\lambda d + \lambda des + \frac{\sqrt{(R(\Delta\lambda d - \lambda des))^2 + (\Delta\lambda d + \lambda des)^2}}{\sqrt{R+1}}\right)$$

For the simple case where the desired exhaust gas mixture air/fuel ratio (λdes) is stoichiometric and the ratio (R) is unity then the following simpler equation can be used:

$$\lambda L = \frac{1}{2} + \frac{\Delta\lambda d}{2} + \frac{\sqrt{1 + (\Delta\lambda d)^2}}{2}$$

Then, the desired rich air/fuel ratio is calculated simply from the following equation:

$$\lambda R = \lambda L - \Delta\lambda d$$

Figure 9:
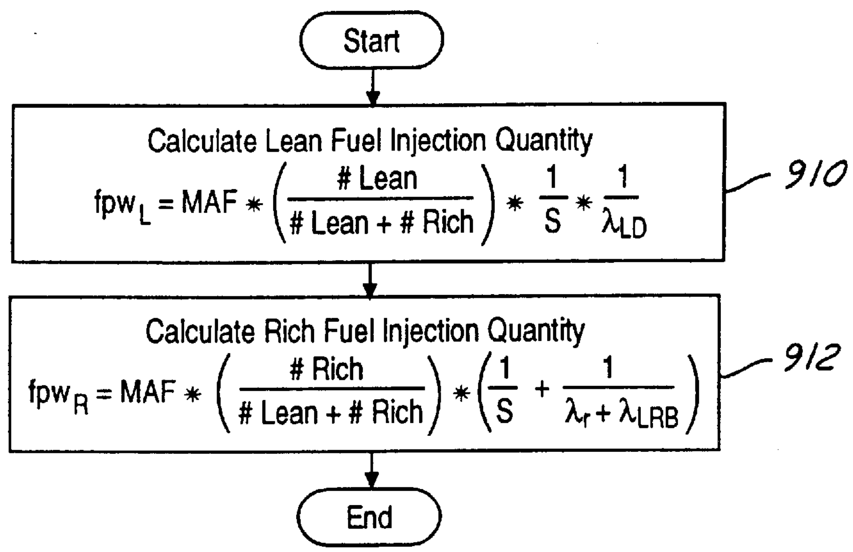

Referring now to FIG. 9, a routine for calculating fuel pulse width signals (fpwL and fpwR) is described. In step 910, the lean fuel pulse width is calculated based on engine airflow from the mass air flow sensor (MAF), the number of lean and rich cylinders, the stoichiometric air/fuel ratio (S), and the desired lean air/fuel ratio (λL). Then, in step 912, the rich fuel pulse width is calculated based on engine airflow from the mass air flow sensor (MAF), the number of lean and rich cylinders, the stoichiometric air/fuel ratio (S), and the desired rich air/fuel ratio (λR) and the rich bias correction (λLRB).

Figure 10:
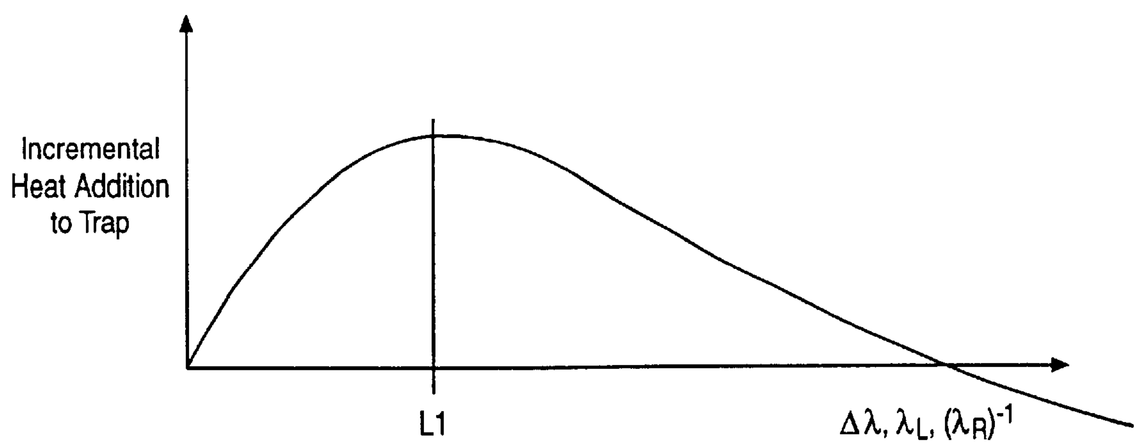

Referring now to FIG. 10, a graph is shown representing an approximate relationship between incremental heat added to the trap versus lean air/fuel ratio (λL), air/fuel ratio difference (Δλ), or inverted rich air/fuel ratio $(\lambda R)^{-1}$. The graph shows that a certain value represents a maximum heat addition. Increasing beyond this point results in less, or even negative, heat addition to the trap. Thus, the control should be limited to the value L1, to prevent control instabilities and less than optimal control. The incremental heat addition to the trap may be determined relative to stiochiometry. The incremental heat addition takes into account both the cooling off of engine out exhaust gas temperature due to operation away from stoichiometry as well as the heat addition from the exothermic reaction proportional to the difference in the lean and rich air/fuel ratios.

Although several examples of embodiments which practice the invention have been described herein, there are numerous other examples which could also be described. For example, the invention may be used to advantage with both direct injection engines in which nitrous oxide traps may be used. The invention is therefore to be defined only in accordance with the following claims.

We claim:

1. A method for air/fuel ratio control of an exhaust gas mixture entering an emission control device, the emission control device located in the exhaust passage of an internal combustion engine having at least a first and a second cylinder, the method comprising the steps of:

calculating a desired air/fuel ratio of the exhaust gas mixture wherein exhaust gases from the first and second cylinders form the exhaust gas mixture;

calculating a lean air/fuel ratio for the first cylinder based on a deviation between a desired emission control device temperature and an actual emission control device temperature;

adjusting said calculated lean air/fuel ratio based on a change in engine load;

operating the first cylinder at said adjusted lean air/fuel ratio;

calculating a rich air/fuel ratio for the second cylinder based on said adjusted lean air/fuel ratio and said desired exhaust gas mixture air/fuel ratio; and operating the second cylinder at said rich air/fuel ratio.

2. The method recited in claim 1 wherein said engine load is a ratio of engine airflow to engine speed.

3. The method recited in claim 1 further comprising the step of setting said desired exhaust gas mixture air/fuel ratio rich of stoichiometry when said desired emission control temperature is achieved, thereby purging sulfur from the device.

4. The method recited in claim 1 further comprising the steps of:

enriching said lean air/fuel ratio when said desired emission control device temperature is achieved; and setting said desired exhaust gas mixture air/fuel ratio rich of stoichiometry when said desired emission control device temperature is achieved.

5. The method recited in claim 1 wherein said desired exhaust gas mixture air/fuel ratio is stoichiometry and said emission control device is a NOx trap.

6. A method for air/fuel ratio control of an exhaust gas mixture entering an emission control device, the emission control device located in the exhaust passage of an internal combustion engine having at least a first and a second cylinder, the method comprising the steps of:

calculating a desired air/fuel ratio of the exhaust gas mixture wherein exhaust gases from the first and second cylinders form the exhaust gas mixture;

calculating a rich air/fuel ratio for the first cylinder based on a deviation between a desired emission control device temperature and an actual emission control device temperature;

adjusting said calculated rich air/fuel ratio based on a change in engine load;

operating the first cylinder at said adjusted rich air/fuel ratio;

calculating a lean air/fuel ratio for the second cylinder based on said adjusted rich air/fuel ratio and said desired exhaust gas mixture air/fuel ratio; and operating the second cylinder at said lean air/fuel ratio.

7. The method recited in claim 6 wherein said engine load is a ratio of engine airflow to engine speed.

8. The method recited in claim 6 further comprising the step of setting said desired exhaust gas mixture air/fuel ratio rich of stoichiometry when said desired emission control temperature is achieved, thereby purging sulfur from the device.

9. The method recited in claim 6 further comprising the steps of:

enleaning said rich air/fuel ratio when said desired emission control device temperature is achieved; and setting said desired exhaust gas mixture air/fuel ratio rich of stoichiometry when said desired emission control device temperature is achieved.

10. The method recited in claim 6 wherein said desired exhaust gas mixture air/fuel ratio is stoichiometry and said emission control device is a NOx trap.

11. A method for air/fuel ratio control of an exhaust gas mixture entering an emission control device, the emission control device located in an exhaust passage of an internal combustion engine having at least a first and a second cylinder, the method comprising the steps of:

calculating a desired air/fuel ratio difference between the first cylinder and the second cylinder based on a deviation between a desired emission control device temperature and an actual emission control device temperature;

calculating a lean air/fuel ratio for the first cylinder based on said desired air/fuel ratio difference and based on a desired air/fuel ratio of the exhaust gas mixture, wherein exhaust gases from the first and second cylinders form the exhaust gas mixture;

adjusting said calculated lean air/fuel ratio based on a change in engine load;

calculating a rich air/fuel ratio for the second cylinder based on said desired air/fuel ratio difference and based on a desired air/fuel ratio of the exhaust gas mixture;

adjusting said rich air/fuel ratio based on a change in engine load;

operating the first cylinder at said adjusted lean air/fuel ratio; and operating the second cylinder at said adjusted rich air/fuel ratio.

12. The method recited in claim 11 further comprising the step of setting desired exhaust gas mixture air/fuel ratio rich of stoichiometry when said desired emission control device temperature is achieved, thereby purging sulfur from the device.

13. The method recited in claim 11 further comprising the steps of:

decreasing said desired air/fuel ratio difference when said desired emission control device temperature is achieved; and setting said desired exhaust gas mixture air/fuel ratio rich of stoichiometry when said desired emission control device temperature is achieved.

14. The method recited in claim 11 wherein said desired exhaust gas mixture air/fuel ratio is at stoichiometry and said emission control device is a Nox trap.

15. A method for controlling a temperature of an emission control device, the device located in an exhaust passage of an internal combustion engine having at least a first and a second cylinder, the method comprising the steps of:

determining a desired emission control device temperature;

operating the first cylinder at a first air/fuel ratio calculated based on a deviation between an actual emission control device temperature and said desired emission control device temperature, and based on an engine load; and operating the second cylinder at a second air/fuel ratio calculated based on a deviation between an actual emission control device temperature and said desired emission control device temperature, and based on an engine load, such that said temperature deviation is reduced.

16. The method recited in claim 15 wherein said engine load is a ratio of engine airflow to engine speed.

17. The method recited in claim 15 further comprising the step of adjusting said first cylinder bank air/fuel ratio and said second cylinder bank air/fuel ratio when said desired emission control device temperature is achieved such that a rich exhaust gas mixture is produced, wherein exhaust gases from the first and second cylinder banks form the exhaust gas mixture.

* * * * *